STANLEY J. REFERMAT
ARTHUR F. TURNER
INVENTORS

United States Patent Office 3,559,090
Patented Jan. 26, 1971

3,559,090
POLARIZATION FREE BEAM DIVIDER
Stanley J. Refermat and Arthur F. Turner, Rochester, N.Y., assignors to Bausch & Lomb Incorporated, Rochester, N.Y., a corporation of New York
Filed Oct. 8, 1968, Ser. No. 765,847
Int. Cl. G02b 1/10, 27/14
U.S. Cl. 350—164                 4 Claims

ABSTRACT OF THE DISCLOSURE

A virtually polarization free beam divider comprises two 45° optical prisms positioned with their hypotenuse surfaces facing each other with a multi-layer thin film structure positioned between the facing surfaces of the prisms. The multilayer thin film structure is composed of a first layer of a dielectric material, a second layer of a metal and a third layer of a dielectric material.

BACKGROUND OF THE INVENTION

Visually, polaization free beam dividers are desirable for precision scientific instruments such as microscopes and metallographic microscopes.

It is well known that light is, in general, partially polarized by reflection from an interface at an angle other than normal incidence. This polarizing property of prior art beam dividers can be detrimental to the performance of a precision scientific instrument, particularly if the incident light is partially polarized or the divided light undergoes further reflections. This partial polarization when introduced into an optical system can cause significant undesirable redistribution of the light over that portion of the visible spectrum measured betwen 400 and 700 nanometers.

The cube type beam divider is used in many scientific instruments for dividing a specific beam of light into two definite directions. There are many beam dividers of the cube type which generally comprise a metallic film deposited on the hypotenuse of a 45° optical prism which is joined to the hypotenuse of a second 45° optical prism.

There are also cube beam dividers which are known that use a multi-layer coating in place of the metallic layer. However, the last mentioned type of beam divider and the metallic type beam divider usually show a wide divergence in the transmission and reflection characteristics of the P and S components of a beam of light.

SUMMARY OF THE INVENTION

We have discovered that a substantially polarization free beam divider of the cemented cube type can be made for that portion of the visible spectrum measured between 400 and 700 nanometers. A beam divider according to our invention comprises two 45° optical prisms positioned as in prior art beam dividers with a dielectric-metallic-dielectric film positioned between the prisms. A beam divider according to our invention provides for minimal difference between the reflectance of the P and S components and the transmittance of the P and S components.

Therefore, it is a primary object of this invention to provide an improved cemented cube beam divider.

It is another object of the present invention to provide a beam divider with a minimal difference in reflectance of the P and S components of a light beam over a broad spectral region.

It is still another object of the present invention to provide a beam divider with a minimal difference in transmittance of the P and S components of a light beam over a broad spectral region.

It is a further object of the present invention to provide an improved beam divider by combining optical prisms with a dielectric-metallic-dielectric film structure.

DETAILED DESCRIPTION OF THE PREFERRED EMBODIMENTS

Figure 1:
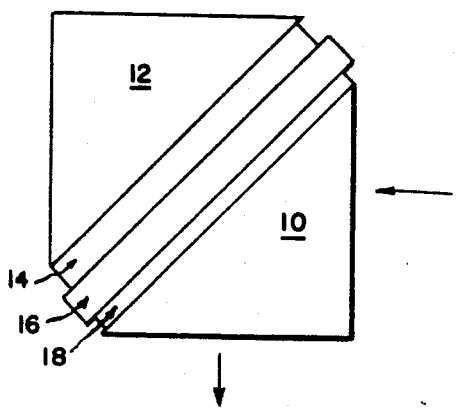
FIG. 1 is a schematic of the beam divider according to the present invention.

Referring now to FIG. 1, there is shown a first 45° optical prism 10 and a second 45° optical prism 12 positioned with their hypotenuse surfaces facing each other Deposited between these prisms 10, 12 is a multilayer film comprising a first layer 14 of a dielectric material, a second layer 16 of a metal and a third layer 18 of a dielectric material.

The material used for the layer 14 and the layer 18 is zinc sulfide and the metallic layer 16 is silver.

We have found that the thickness of each layer will of necessity vary depending upon the index of refraction of the glass and the angle of incidence in that particular glass.

In order to define acceptable beam dividers, it was necessary to define certain characteristics capable of measurement by known techniques.

The first of these characteristics is identified by a term referred to as $\Delta T_{max}$. The term $\Delta T_{max}$ is the absolute value of the maximum difference between the P and S components of transmittance occurring in the 400 to 700 nanometer range of the spectrum and equals $T_p - T_s$. The term $\Delta T_{max}$ is a quantity measure of the maximum monochromatic beam divider polarization, is easy to measure and describes an important characteristic of a beam divider according to the present invention.

Another characteristic parameter capable of finite determination is designated alpha ($\alpha$) and is the normalized P and S transmittance difference integrated over a given wavelength band of the spectrum. This parameter alpha ($\alpha$) is a quantity measure of the broad band polarization of the beam dividers and is calculated from the formula:

$$\alpha = \frac{1}{(\lambda_2 - \lambda_1)} \int_{\lambda_1}^{\lambda_2} [T_p(\lambda) - T_s(\lambda)] d\lambda$$

wherein:

$\lambda_1$ is 400 nanometers.
$\lambda_2$ is 700 nanometers.

The final characteristic criteria for evaluation is designated as tau ($\tau$) which is the difference between the maximum value of the average transmittance and the minimum value of average transmittance over the 400 and 700 nanometer range of the spectrum. The characteristic $\tau$ is a measure of the spectral neutrality of the beam dividers calculated from the formula:

$$\tau = T_{ave}(max) - T_{ave}(min)$$

wherein:

$$T_{ave} = \frac{T_p + T_s}{2}$$

An ideal polarization free beam divider should have values for $\Delta T$, alpha ($\alpha$), and tau ($\tau$) of zero. However, ideal conditions cannot readily be achieved. Therefore, we have discovered that significantly improved beam dividers result when $\Delta T$ is 0.09 maximum, alpha ($\alpha$) is 0.05 maximum and tau is 0.015 maximum.

It is possible to construct beam dividers according to our invention that will satisfy the above requirements. We have found that for a 45°–90°–45° glass prism having an index of refraction of 1.52 an acceptable beam divider comprises a multilayer film structure built up of a layer effectively ¼ wave optical thickness at 600 nanometers of zinc sulfide, a layer of semi-transparent silver and a layer approximately ⅛ wave optical thickness at 600 nanometers of zinc sulfide deposited in that order on a 45° optical prism substrate and combined with another 45° optical prism.

The optical constants for silver used in inferring the silver film thickness were those published in the American Institute of Physics Handbook, second edition, at pages 6–116, 6–117 (McGraw Hill, New York, N.Y. 1963). As long as the measured silver film reflectance-transmittance value pairs approximated the value pairs computed by using the optical constants set forth in the foregoing reference work, consistently good beam dividers were achieved. The physical thickness of silver was inferred by these computations to be from 120 to 600 A., depending on the $R/T$ ratio desired.

The optical thickness of the zinc sulfide layers was determined experimentally using spectrophotometers. We have found that the beam divider performance was not materially affected by using dielectrics with indices in the range of 1.8 to 2.5.

Referring back to FIG. 1, the optimum design range arrived at comprised two prisms of glass having an index of refraction of between 1.52 and 1.58. The first film 14 of the zinc sulfide is deposited ¼ wavelength effective optical thickness measured at a preselected wavelength between 400 and 700 nanometers. The silver film 16 is deposited at a thickness so that the normal incidence transmission at 550 nanometers will vary between 0.04 and 0.56. When the measured transmittance is 0.04 the silver film is approximately 600 A. thick and the beam divider reflectance transmittance ratio $(R/T)$ is 0.75/0.06. At 0.56 measured transmittance the silver film is approximately 120 A. thick and the beam divider $(R/T)$ is 0.09/0.68. The third film 18 is zinc sulfide of a fractional ¼ wavelength effective optical thickness measured at the same wavelength as film 14 between 400 and 700 nanometers. We have found that for a given substrate this value will vary between 0.3 and 0.5 of ¼ wavelength effective optical thickness between 400–7000 nanometers.

Multifilms, according to our invention, can be made in a vacuum coater. The zinc sulfide is deposited from commercial material using a vacuum coater at a pressure of $1-3\times10^{-5}$ torr using an average deposition rate of 800 angstroms physical thickness per minute. The silver film is also deposited in a vacuum chamber at a pressure of between $8\times10^{-6}$ to $2\times10^{-5}$ torr. A rapid deposition rate for depositing the silver of three seconds or less is desirable for an acceptable coating. The silver is in the form of 99.99 percent pure shot evaporated from a molybdenum boat.

After the deposition of the films, two prisms, one with and one without a coating, are brought together and assembled. A permanent structure can be achieved by cementing the prisms with any well-known optical cement.

Figure 2:
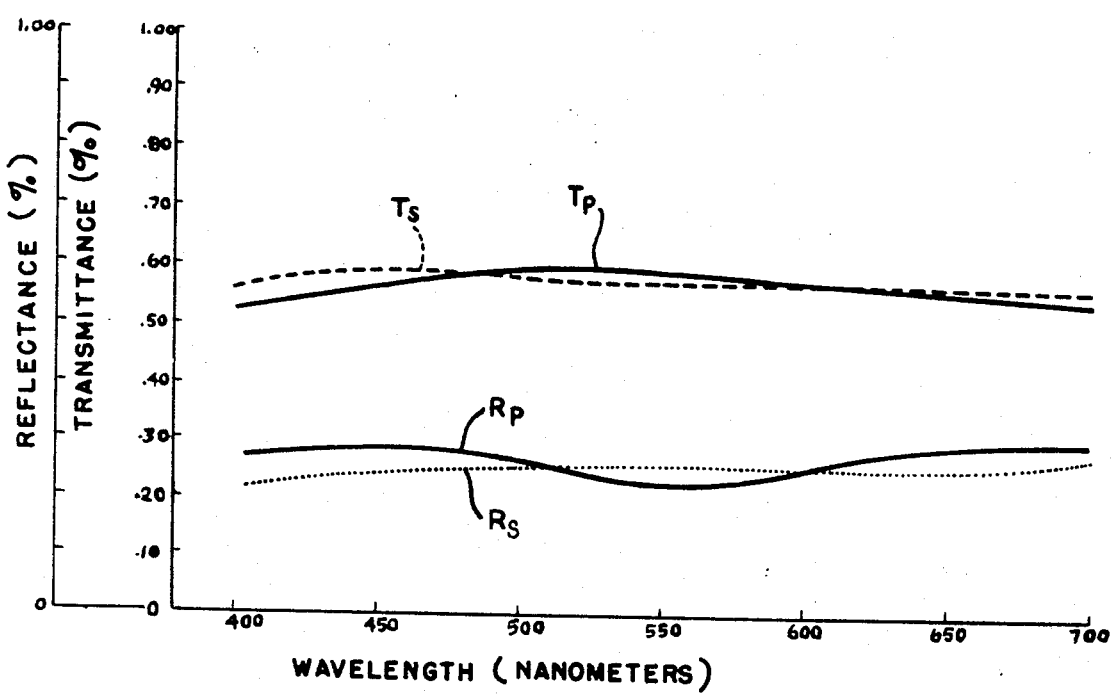
FIG. 2 is a plot of measured P and S transmittance and P and S reflectance against wavelength in nanometers for a beam divider constructed according to FIG. 1.

FIG. 2 shows the transmittance and reflectance of a beam divider wherein the optical thickness of the dielectric layers were referred to a wavelength of 580 nanometers. It is evident from FIG. 2 that the transmittance and reflectance characteristics of the P and S components are almost identical.

Figure 3:
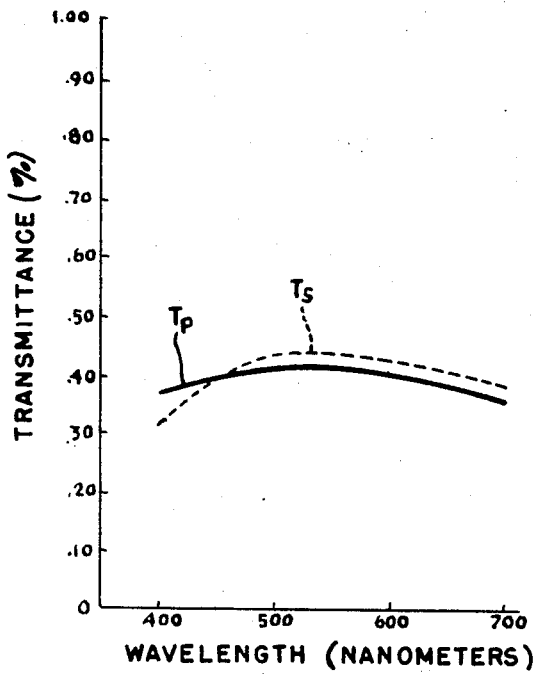
FIG. 3 is a plot of measured P and S transmittance of a second embodiment constructed according to FIG. 1.
Figure 4:
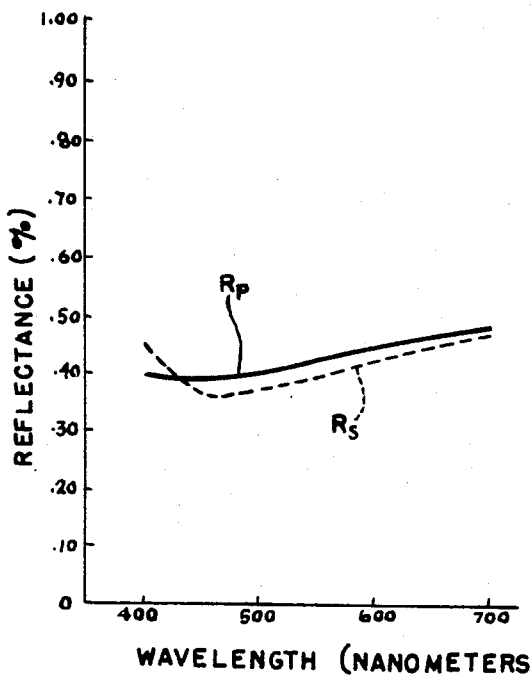
FIG. 4 is a plot of measured P and S reflectance against wavelength in nanometers for the cemented cube beam divider used in acquiring the plot of FIG. 3.

FIGS. 3 and 4 shows the spectral transmittance and reflectance, respectively, for a beam divider wherein the optical thickness of the dielectric layers were referred to a wavelength of 700 nanometers. Once again, it is apparent that improved results are achieved with a device constructed according to the principles of the present invention.

Figure 5:
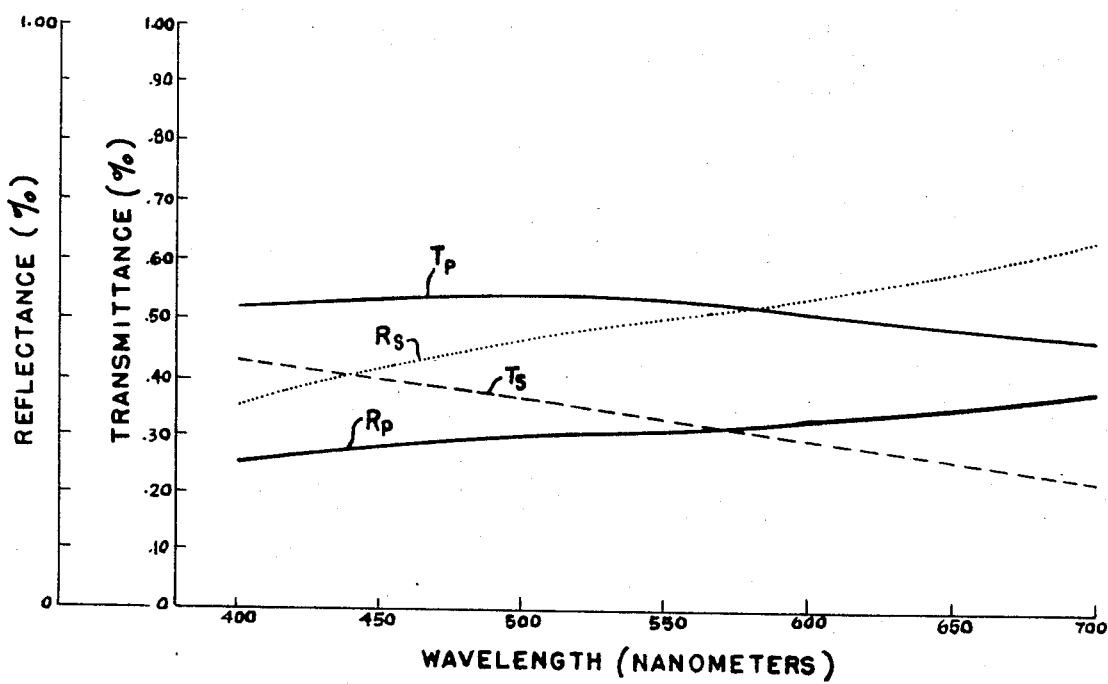
FIG. 5 is a plot of measured P and S transmittance and P and S reflectance of a third embodiment of a cube type beam divider wherein there is a layer of silver deposited between facing hypotenuse surfaces of two 45° optical prisms.

Comparing FIGS. 2, 3 and 4 with FIG. 5 it is apparent that beam dividers according to our invention are a significant improvement over a metallic silver beam divider.

We have also compared several beam dividers in accordance with the parameters of $\Delta T$, alpha ($\alpha$) and tau ($\tau$) described above. These are set forth in the following Table I along with the $R/T$ for each device.

TABLE I

| Sample | $\Delta T_{max}$ | $\alpha$ | $\tau$ | $R/T$* |
|---|---|---|---|---|
| Multifilm beam divider | 0.73 | 0.38 | 0.16 | .50/.50 |
| Silver beam divider | 0.22 | 0.17 | 0.12 | .45/.48 |
| Beam divider for 1.58 prism (fabricated) | 0.04 | 0.016 | 0.03 | .25/.65 |
| Beam divider for 1.52 prism (fabricated) | 0.03 | 0.013 | 0.07 | .49/.38 |
| Beam divider for 1.52 prism (calculated) | 0.03 | 0.013 | 0.08 | .42/.55 |

*Measured at 550 nanometers neglecting glass-air interface reflections.

It is apparent from the foregoing table that improved beam dividers result when constructed according to the principles of our invention.

It is possible to use other dielectric materials that will produce a film similar in optical quality to zinc sulfide without departing from the teaching hereinbefore described. Suitable dielectrics include, by way of illustration and not limitation, magnesium oxide, cerium oxide, titanium dioxide, zirconium oxide, antimony trioxide, lead chloride, lead oxide, lead fluoride, neodymium oxide, lanthanium oxide and tin oxide. There may be other dielectric materials that can be used as long as they have an index of refraction within the range of 1.8 to 2.5.

It is also possible to use metals other than silver. Examples of suitable metals include, by way of illustration, aluminum and magnesium.

We have also found that the multilayer thin film structure can be applied to prisms where the angle of incidence in the glass is other than 45°. Beam dividers of this type also show improved polarization characteristics.

While we have disclosed our invention in reference to a preferred embodiment, we wish it understood that the invention should be limited only in accordance with the scope of the appended claims.

We claim:
1. A polarization-free beam divider, comprising:
   a first optical prism having a side hypotenuse surface;
   a first layer disposed on the hypotenuse surface, comprising a material having an index of refraction of 1.8 to 2.5 and one-quarter wavelength in optical thickness measured at 400 to 700 nanometers of the visible spectrum;
   a second layer disposed on the first layer, comprising silver having a thickness for providing a normal incidence transmittance between 0.04 and 0.56 at 550 nanometers wavelength;
   a third layer disposed on the second layer, comprising a material having an index of refraction of 1.8 to 2.5 and 0.3 to 0.5 of one-quarter wavelength measured at 400 to 700 nanometers of the visible spectrum; and
   a second optical prism having a side hypotenuse surface disposed to face the hypotenuse surface of the first prism and in intimate contact with the third layer.

2. The polarization-free beam divider as defined in claim 1, wherein:
   the material for the first and third layers comprises zinc sulfide.

3. The polarization-free beam divider as defined in claim 1, wherein:
   the side hypotenuse surface of each prism extends at 45° from one of the other prism side surfaces, respectively.

4. A polarization-free beam divider, comprising:
a first optical prism having a side hypotenuse surface extending at 45° from one of the other prism side surfaces;
a first layer disposed on the hypotenuse surface, comprising zinc sulfide of one-quarter wavelength in optical thickness measured at 400 to 700 nanometers of the visible spectrum;
a second layer disposed on the first layer, comprising silver having a thickness for providing a normal incidence transmittance between 0.04 and 0.56 at 550 nanometers wavelength;
a third layer disposed on the second layer, comprising zinc sulfide of 0.3 to 0.5 of one-quarter wavelength measured at 400 to 700 nanometers of the visible spectrum; and
a second optical prism having a side hypotenuse surface extending at 45° from one of its other side surfaces, the last mentioned hypotenuse surface disposed to face the hypotenuse surface of the first prism and in intimate contact with the third layer.

References Cited

UNITED STATES PATENTS

| | | | |
|---|---|---|---|
| 2,422,376 | 6/1947 | Turner et al. | 350—164 |
| 2,854,349 | 9/1958 | Dreyfus et al. | 350—1X |

OTHER REFERENCES

Pohlack, H., "New Methods of Chromatic and Achromatic Beam Splitting," Jena Review, Part I—vol. 3, June 1958, pp. 82–85.

Steckelmacher et al., "Apparatus for the Controlled Deposition of Optical Film Systems," Vacuum, vol. 9, No. 14, September 1959, pp. 183 and 184.

DAVID SCHONBERG, Primary Examiner

T. H. KUSMER, Assistant Examiner

U.S. Cl. X.R.

350—152, 173